United States Patent Office 3,438,836
Patented Apr. 15, 1969

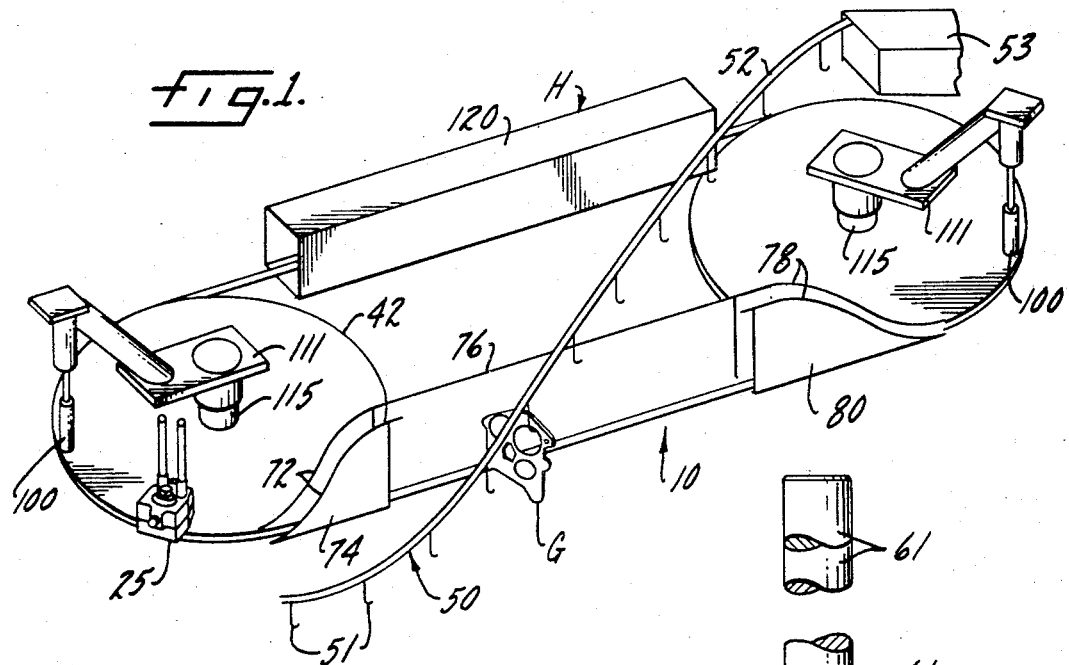
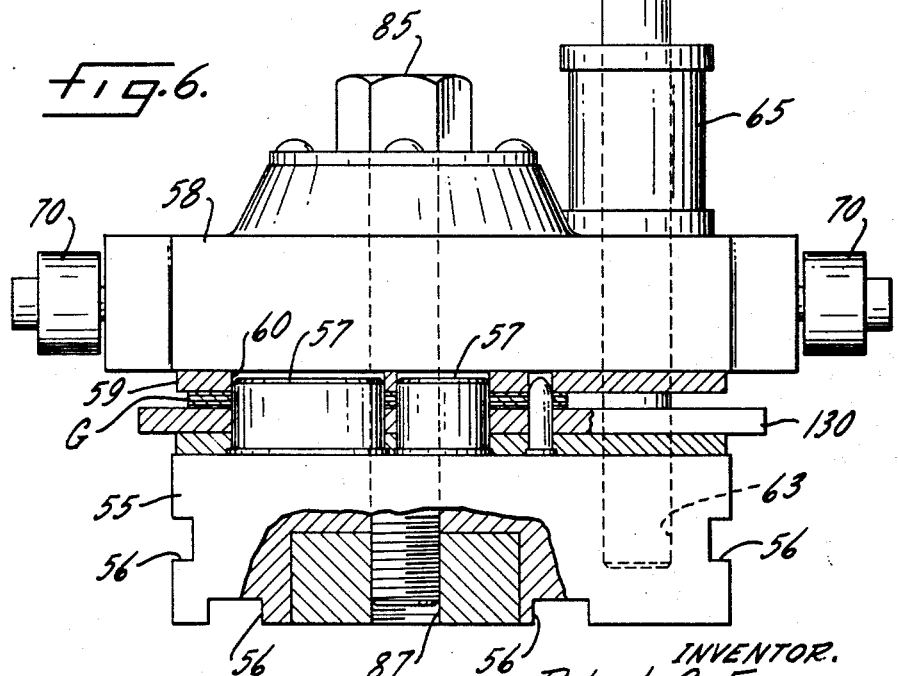

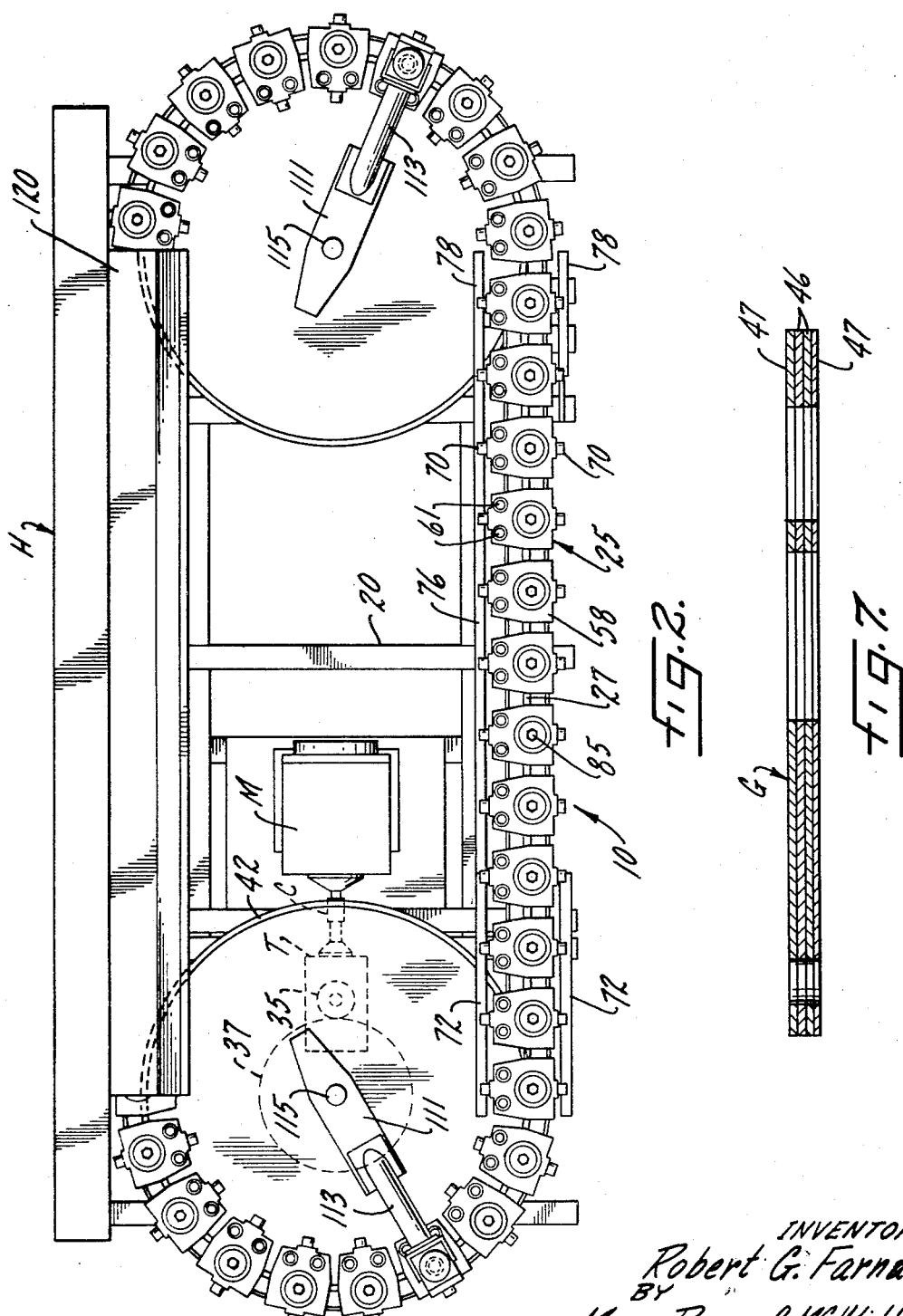

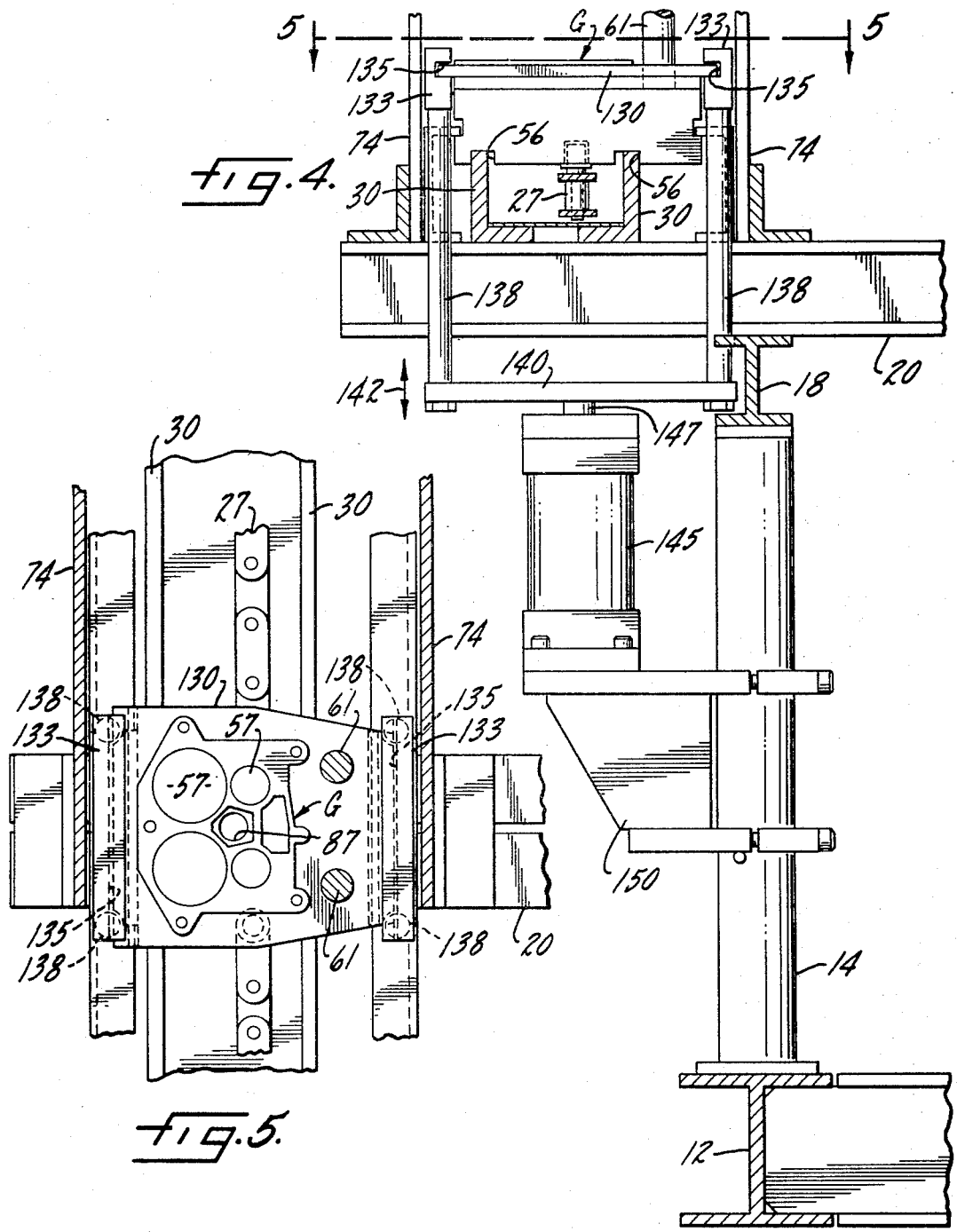

3,438,836
APPARATUS FOR FORMING LAMINATES
Robert G. Farnam, Glen Ellyn, Ill., assignor to F. D.
Farnam Co., a corporation of Illinois
Filed June 6, 1966, Ser. No. 555,393
Int. Cl. B30b 15/34
U.S. Cl. 156—583                    8 Claims

ABSTRACT OF THE DISCLOSURE

Apparatus for preparing laminated gaskets and similar objects in which a plurality of die blocks are attached to an endless moving chain. After the laminae are placed in a cored die block the block automatically is closed by means of a torque wrench which closes the block to the desired pressure by turning a bolt which passes through the head of the die block and is threaded into a tapped hole in the other member of the die block. After the die block is closed to the desired pressure, it passes through a heated tunnel where it is heated to the desired temperature. After the blocks emerge from the heat tunnel, they are automatically opened by another torque wrench and the laminate is automatically freed from the cored die block by means of a lifting plate and removed from the block.

---

The present invention relates to apparatus for heat and press forming materials. It is directed to improvements in automatic high speed machinery for applying a predetermined pressure and temperature to laminae for bonding them into a unit.

It is an objective of the present invention to provide a highly automated machine for hot press forming of laminar parts or bonding them into a single element. It is an objective, related to the foregoing, to provide such a machine which is capable of accurate control and timing of the various steps necessary in the hot press forming of the parts.

It is still another object of the present invention to provide an improved hot press forming machine which is capable of a high output per unit time, involving little manual labor, and a minimum amount of plant space due to the compactness of the operation.

A further object of the present invention is to provide an improved automatic hot press forming machine which is capable of a high degree of versatility in the amount of pressure to be applied, the amount, and length of time, the heat is to be applied, thus permitting its use for any number of different parts irrespective of the individual heat and pressure requirements for the bonding thereof.

Other objects and advantages of the present invention will appear from the following detailed disclosure, taken in conjunction with the drawings, wherein:

FIG. 1 is a perspective of an exemplary layout for a machine embodying the present invention;

FIG. 2 is a top plan of the machine of FIG. 1, illustrating the arrangement of elements in greater detail;

FIG. 4 is an enlarged section of FIG. 2, taken through line 4—4 thereof;

FIG. 5 is a fragmentary section taken through lines 5—5 of FIG. 4;

FIG. 6 is an elevation, partially in section, of an exemplary die block;

FIG. 7 is a transverse cut through an exemplary gasket showing the layers thereof.

Figure 3:
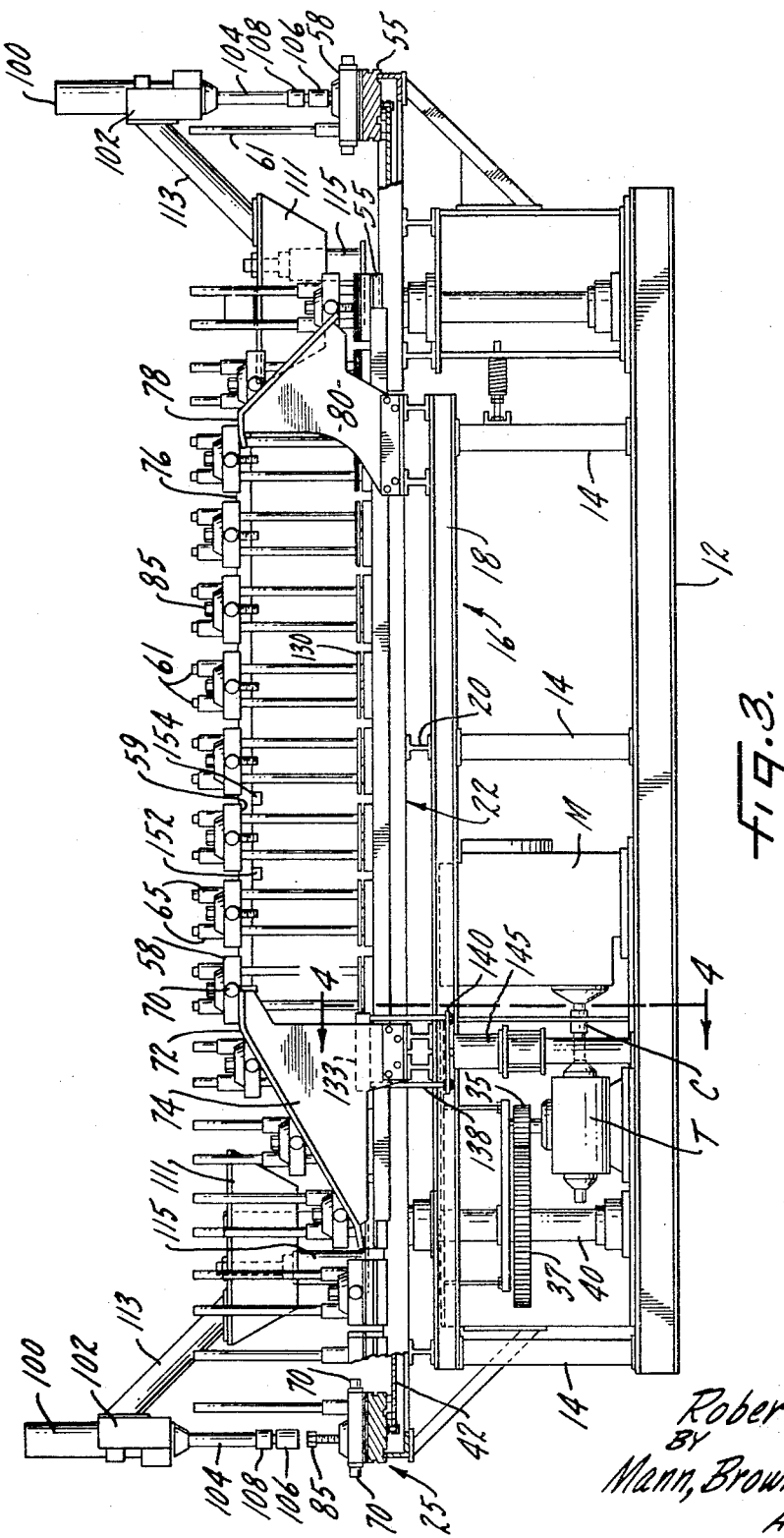
FIG. 3 is a side elevation of the machine of FIG. 2, and showing particularly the apparatus for applying pressure to, relieving pressure from, and opening the portions of the die.

While the invention is susceptible of various modifications and alternative constructions, a particular illustrative embodiment has been shown in the drawing and will be described below in detail. It will be understood, however, that there is no intention to limit the invention to the specific form disclosed, but, rather, the intention is to cover all modifications, alternative constructions and equivalents falling within the spirit and scope of the invention as expressed in the appended claims.

OVERALL MACHINE ORGANIZATION

The machine of the present invention brings about a unity of action of a number of individual elements, all of which are combined to achieve the results for which the machine was devised. It will be helpful, therefore, in understanding the role which the elements to be hereinafter described play in the overall combination, to first discuss the machine as a whole.

Accordingly, with reference to FIG. 1, a machine embodying the present invention is indicated generally at 10. The machine is supported upon a suitable base 12 having pillars 14 which support a platform 16 which may take any convenient form, and as illustrated comprises a number of I beams 18, running longitudinally of the machine and cross beams 20, together supporting an oval track 22. It will be understood that, while the exemplary machine herein described is oval in shape (see FIG. 2) that any shape or configuration commensurate with the space available at the factory site, will permit the objectives of the invention to be accomplished.

The track 22 supports a plurality of serially spaced die blocks 25. The blocks are uniformly serially spaced on the track, forming an endless chain of such blocks thereabout.

The blocks are adapted to move upon the track, thereby passing through the various stages of the operation intended to be performed by the machine. To this end, and with particular reference to FIG. 4, each of the die blocks is fastened, in any suitable manner, to a drive chain 27. The drive chain travels in a channel defined between a pair of upstanding rails 30 which together define the track upon which the die blocks move. Thus, the blocks remain equally spaced about the machine, and are all driven from the same power source, and at the same rate of speed.

Having established the chain drive as described above, any number of suitable power sources to drive the chain itself will occur to those skilled in the art. For this reason, a particular drive of the exemplary machine is illustrated, somewhat schematically. More particularly, referring to FIG. 3, a suitable electric motor M is conveniently disposed in the center of the oval in otherwise unused space. The motor drives, by means of a suitable coupling C, a transmission T. The transmission may be variable speed, or the motor itself may have a variable speed control, but in any event power is transmitted through the transmission to a pinion 35 which engages a large diameter spur gear 37 mounted upon an axle 40 which connects to an even larger drive gear (see FIG. 2) 42 which engages the chain at one end of the oval of the track. By virtue of the gear ratio employed, power adequate to move any number of die blocks is readily available in smaller conventional motors such as that shown.

While the machine of the present invention was born of the need for an automatic high speed hot press machine for forming laminar throttle body gaskets for automotive carburetors, it will be readily apparent that the prospective uses of the devices are manifold, and there is neither intent nor justification for limiting the scope of the invention to utility in this rather specific area. None the less, it will be of assistance in describing the device, and understanding its unique advantages, if the particular throttle body gasket previously referred to is described briefly.

The gasket G in question (FIGS. 6 and 7) comprises a four part assembly consisting of two die cut pieces of uncured resin treated fiberboard 46. The outer members 47 of the sandwich, are formed of uncured sheet packing composed of precoated asbestos fibers, vegetable fibers, and very small cork particles, and coated with nitrile rubber. The sandwich, as the gasket will sometimes hereinafter be referred to, requires both heat and pressure to bond the various laminae together. Accordingly, the herein illustrated machine is constructed to provide the necessary pressure and heat to accomplish adequate bonding of the sandwich to form the gasket.

The unbonded sandwich is either manually or automatically disposed between the male and female die block members in the lower central area of the machine, as seen in FIG. 2. In terms of relative location of the various operations required, the die block members or portions are first brought together in a manner which causes a predetermined even pressure to be applied over the surfaces of the laminar elements. This occurs, as exemplified here, at the right of the machine, in the area of the right radial portion, as seen in FIG. 2, then pass into a heat tunnel designated generally as H, where a predetermined temperature is maintained throughout the length thereof. The length of the tunnel is, of course, such that a die block moving at a predetermined rate from one end thereof to the other will receive precisely the amount of heat for the exact amount of time required to achieve the bonding of the sandwich.

At the left radial portion of the machine, as seen in FIG. 2, the die block portions are pressure relieved, and thereafter, at the lower central portion of the machine, the finished product is removed.

Referring again to FIG. 1, certain parts or elements of the nature described, require secondary curing. This might involve additional heating, cooling or coating of some sort. To this end, a chain conveyor indicated generally at 50 is provided, and comprises a plurality of elongated hooks 51 fastened in spaced relation upon an endless chain. In the interest of saving factory floor space, the chain is readily guided on a suitable track 52 upwardly to an area above the machine where the additional operation may be performed in a chamber 53. The height of the hooks 51 are deliberately placed conveniently within the reach of the operator at the position where the finished part is removed from the die blocks. Thus, there is no danger of injury due to inadvertent contact with the hooks.

DIE BLOCK CONSTRUCTION

The die blocks, in accordance with the present invention, form the dual function of carrier for the laminar parts as they go through the various stages of bonding, but more particularly, is constructed to provide the necessary pressure for bonding uniformly over the entire surface of the sandwich.

An exemplary die block is shown in an enlarged view in FIG. 6, and comprises a base plate 55, having parallel slots 56 in the bottom thereof for engagement with the rails 30. The die block is formed with a plurality of cores 57 extending upwardly from the surface thereof. These cores correspond to the configuration of the principal openings in the sandwich so as to hold the laminar parts in precise overlapping position with one another when they are placed on the die block.

A die head 58 is formed with a complementary face 59 for engagement with the base plate, recesses 60 being formed in the head corresponding to the core members on the base plate so that the head and base plate may come together in face-to-face relation.

In order that the sandwich of laminar parts may be placed on the base plate, and the finished product removed therefrom, it is necessary for the head and base plate, to be spread open, or one moved away from the other, in order to permit access to the face of the base plate. To this end, a plurality of elongated guide posts 61 are provided, which may be screwed or otherwise fastened into appropriate holes 63 in the face of the die block base, and which extend upward and are journalled in bosses 65 in the head. Accordingly, the head may move up and down on the guide post 61, while at all times remaining in perfect alignment with the base plate.

CLOSING AND OPENING OF THE DIE BLOCKS

Still another feature of the present invention is the automatic opening and closing of the die blocks without resort to either manual handling of the heavy die block parts.

With reference to FIG. 3, the present invention provides a camming arrangement whereby the heads of the die blocks are automatically raised prior to the blocks reaching the unloading and loading area, and are then closed, one upon the other, as the die blocks leave the loading area.

More specifically, each die block head is provided with a circular cam follower 70, preferably coaxially disposed, one on each side of the die block. As each die block comes out of the left hand oval (as seen in FIG. 2) the cam followers 70, which may simply be cylindrical rollers mounted on supporting shafts connected directly to the head, engage. An upwardly sloping cam 72 is aligned with each cam follower on either side of the track. In the exemplary case, the cam is simply an upwardly sloping hardened cam surface formed or otherwise fastened on a supporting plate 74. Placement of a cam on both sides of the head provides uniform lifting of the relatively heavy head. As the die block moves to the right, as seen in FIG. 3, the head portion is automatically lifted upwardly on the guide post 61 until it reaches the top of the cam which is at any suitable working height above the base member. Thus, the die block is opened, permitting removal of the bonded gasket and reloading.

However, since the die blocks are continuing to move at a uniform rate across the working area, the present invention provides a lateral cam track 76 as an extension of the rear cam surface 72. The cam track extends laterally across the working area of the machine to hold the head in its open position for a suitable distance. Since the die heads are more easily controlled once it is litfed by the cam 72, it has been found unnecessary to support the same on both sides while in the raised position.

Closing of the die blocks is accomplished, in accordance with the invention, in substantially the same manner as the opening thereof. Thus, descending cam surfaces 78 are provided at the right hand end of the machine prior to entry of the die blocks into the right radial section. The specific location is, of course, variable according to need. The cams are supported on a suitable plate 80, one on each side of the track, and because gravity is available as an assist to closing the head upon the base member, the slope of the cam 78 is more severe than that of the cam 72, and is sufficient only to maintain control of the head to prevent excess shock when it meets the base. Thus, the head is quickly closed upon the base member and the laminar sandwich secured between the two preparatory to being bonded.

APPLICATION OF PRESSURE TO THE SANDWICH

The invention contemplates the use of the die blocks themselves as the device for applying the necessary uniform pressure required for binding the particular article involved, in this case, a carburetor gasket. In accordance with this aspect of the invention, each die block is equipped with an adjustable pressure applicator. In the illustrated form, each head is provided with a central bore through which extends a freely rotatable heavy shouldered bolt 85. In axial alignment with the bolt, there is an aperture 87 in the base plate having heavy threads tapped therein so that the bolt 85 may be screwed into the base plate, thereby drawing the head and base plate together, to the end of applying substantial pressure to any objects or articles disposed between the two. The tapped hole 87 is of sufficient depth so that any required pressure might be applied without a bolt bottoming in the hole.

Application of pressure in the manner described is accomplished, in accordance with the invention, by means of an automatic torque wrench arrangement such as that illustrated at either of the radial ends of the machine in FIGS. 2 and 3.

Referring first to the pressure applying wrench, shown at the right hand end of FIG. 3, a torque wrench 100 of known construction is disposed in a mounting clamp or bracket 102 so as to hold the same in a vertical disposition. The support 102 is disposed directly over the track, and an elongated drive shaft 104 on the wrench is connected to a socket 106 adapted to engage the head of the bolt 85. A torque limiting coupling 108 is provided between the shaft and the socket so that when the desired tightness of the bolt has been achieved, the torque limiting clutch will simply override, transmitting no further force to the socket.

The wrench 100 is supported from a pedestal 111 by means of an outwardly extending arm 113. The pedestal is disposed on a pillar 115 which, in the embodiment under discussion, is located at the center of the radius of curvature of the oval. Accordingly, the pedestal pivots on the pillar 115 and the wrench is thus rotatable in an arc which is identical to that traversed by the die blocks as they move about that end of the machine. With this arrangement, it is now possible to engage the torque wrench with the head of the bolt 85 on a die block which has just been closed by coming off the cam 78, and tighten the bolt while the die block continues to move about the track. When the bolt has been tightened the requisite amount, the wrench is simply lifted, returning to a position adjacent the forward end of the cam 78 where it picks up another bolt on the next succeeding die block and spins it closed to the requisite pressure.

Any conventional wrench of the type described may be used, and many are widely known and readily available. Any number of torque limiters are available to permit a wide range of pressure to be applied. An impact type torque wrench would be suitable. It is preferable that a relatively high speed arrangement be provided so that the time required to apply the requisite pressure is minimized. This permits the machine to operate at the highest possible rate of speed.

While the tightening operation just described could readily be performed manually without loss of speed, those skilled in the art will appreciate that it also can be performed automatically. By using a microswitch to sense the position of the unpressurized die block, the wrench, through suitable pneumatic controls functioning through position oriented limit switches may be brought directly to bear upon the bolt 85. Wrenches are available which are actuated upon sensing the pressure of engagement with the bolt to be tightened. Because of the particular mounting of the wrench and associated supporting mechanism, the wrench will simply follow the die block as it moves on the track until such time as the proper pressure has been applied between the members of the die block. Having knowledge of the speed of the wrench, and time required to apply the pressure, the placement of a suitable limit switch at a point along the track, to be tripped by the die block as it passes that point, will cause the wrench to retract, and move to pick up the next preceding die block and apply the pressure to the same.

The opening, or relieving of the pressure on the die block is accomplished in an identical manner with identical equipment though the procedure is reversed. For this reason, the wrench and carrier on the left hand side of the machine, as seen in FIG. 3, bears identical numbers and no detailed description is offered regarding that wrench. Suffice it to say that the wrench will pick up a die block at a suitable place as it enters the radius of the curve, and will spin the bolt 85 loose, thereby relieving the pressure on the sandwich between the die block members. As discussed with respect to the wrench on the right hand side, the operation of this particular wrench may be either manual or automatic without departure from the invention.

In place of using a torque wrench and a screw for applying pressure to the sandwich, it would, of course, be possible to use a swingable hydraulic press to apply a given amount of pressure, and in such a case the clamping bolt could have a bayonet type of locking action operable on a partial turn of the bolt and with the unlocking being accomplished by reverse rotation.

APPLICATION OF HEAT

It is contemplated that both heat and pressure in predetermined accurately gauged amounts are required to bond the elements of the gasket properly. Application of the necessary heat is accomplished, in keeping with the invention, by means of a heat tunnel simply marked H in FIG. 2. The tunnel comprises a suitable shroud 120 which covers the track, and is of sufficient height to permit the guide posts 61 to move therethrough. The shroud may be of heat reflective material, and relatively close fitted over the track so as to intensify the application of heat to the die block which, of course, is conducted directly to the sandwich pressed therein. Either a gas flame, or electric heat, may be supplied to the shroud and conventional thermostatic controls may be supplied to regulate the temperature required. The heated length of the tunnel, is, of course, proportionate to the time during which the heat must be applied. This time is a function of the speed at which the die blocks are moving. All of this may be readily regulated in order that the requisite heat curing may be applied.

REMOVAL OF FINISHED BONDED ELEMENTS

An added feature of the invention is the provision for ready removal of the hot bonded gaskets from the die blocks once they are opened. This is accomplished by automatically freeing the finished unit from the cores on the base plate to permit its ready extraction from the die.

Referring to FIGURES 3 and 4, a stripper plate 130 is provided on each base plate, in overlying relation. The plate is relatively thin, and is formed so as to fit over the core members 54, which extend a suitable distance, usually in excess of the thickness of the elements to be placed thereon, above the plate 130.

As the die blocks move between the cam plate 74, the stripper plate, which overlaps the die block by a small amount in a direction transverse to the movement thereof, engages a pair of jaw shaped lifts 133 disposed on either side of the track, within the plate 74. Each of the lifts is provided with a lateral groove 135 of sufficient depth and width so as to readily receive the extended ends of the stripper plate 130. The lifts are connected to rods 138 which are tied together by a rigid cross member 140.

The cross member 140 is reciprocable in the direction of an arrow 142 by means of a pneumatic motor 145 having an actuating rod 147 connected directly to the plate 140. The motor is grounded by means of a suitable support 150 fastened directly to a pillar 14, and is conveniently actuated by means of a microswitch (see FIG. 3) 152, which can be placed in any available position, such as on the track 76 where it is actuated by the passage of a die head member. Because the die blocks are equally spaced from one another, and moving at a constant speed, the switch may be actuated either upstream or downstream of the actual stripping area.

Upon actuation of the motor 145, the lifts 133 raise the stripper plate 130 from the base member an amount sufficient to lift the finished product off the core members 54. With a view toward more complete automation, a flexible finger might be provided, actuated by the presence of the stripper plate adjacent the same, to sweep the finished product off the flat plate and into a box, or into the hands of an operator who may then send it on to the secondary curing by hooking the same on one of the hooks 52 adjacent this area. A second microswitch 154 causes the motor 145 to reverse, dropping the plate 130 into its normal position on the base member, and the base member is again ready to be cleaned, lubricated, if necessary, and loaded with the next set of laminar elements to be bonded. Where required, a tamping or spanking of the elements may be undertaken before the die block is closed.

Thus, a complete cycle is completed, requiring an absolute minimum of time and manual labor. Machines of this type, operating to bond the gasket hereinbefore described, may be expected to turn out a finished gasket every five to ten seconds on a machine having a size of no greater than ten feet from center to center of the pillars 115. Yet the machine is sufficiently versatile so that any suitable configuration, conforming to the factory space available, may be employed. It is to be noted, for example, that is is a very simple matter to increase the distance between the chain sprockets and thereby add more die blocks.

I claim as my invention:

1. Apparatus for heat press forming a laminae into a single article comprising a frame having a guideway formed thereon; a plurality of die blocks serially spaced on said guideway, drive means interconnecting said die blocks in an endless line for moving the same at a uniform speed over said guideway, said die blocks each having a base portion including a face for receiving the laminae in a predetermined position, and a head portion, said head portion having a face complementary with the face of said base portion, guide means interconnecting said base and head portions, permitting relative movement toward and away from one another while maintaining alignment thereof, a clamping bolt extending through said head portion and having an end portion engageable with said base portion so that said portions may be held together to apply predetermined pressure to the part therebetween, means for rotating said clamping bolt to hold said head and base portion together with said predetermined pressure to said part, a heat tunnel for raising the temperature of said part, means for loosening said bolts after said parts leave said heat tunnel, and means for opening said die portions for removal of the bonded article therefrom.

2. The apparatus as set forth in claim 1 wherein means is provided adjacent where said bonded article is removed for receiving said article and provide secondary curing thereof.

3. Apparatus for heat press forming laminae into a single article comprising a frame having a guideway formed thereon, an endless chain of die blocks on said guideway, drive means engageable with said die blocks for moving the same at a uniform speed over said guideway, each said die block comprising a base portion on said guideway having a face for receiving the laminae in a predetermined position, and a head portion, said head portion having a face complementary with the face of said base portion, guides extending upwardly from said base, said head portion being journaled for reciprocable movement thereon while maintaining alignment thereof with said base, a clamping bolt extending through said head portion and having an end portion engageable with said base portion so that said portions may be held together to apply predetermined pressure to the part therebetween, wrenches for automatically rotating said clamping bolt to engage and disengage said head and base portions, means to apply and relieve a predetermined pressure to said laminate, a heat tunnel for raising the temperature of said part, and a cam disposed adjacent said guideway and engageable with said head portion for separating said die portions for removal of the finished part therefrom.

4. Apparatus as defined in claim 3 wherein a cam is disposed at one side of said guideway, and each said head portion is provided with cam followers for engagement with said cam as each said die block moves therepast.

5. Apparatus as set forth in claim 4 wherein said cam for opening and closing said die portions defining a loading and receiving station, and a guide track is engaged with said cam for holding said head portion separated from said base portion as said die block moves through said station.

6. A machine for heat press bonding of laminae having coincident, matched openings into a single article comprising; a guideway in the form of a closed loop, separable die blocks for receiving said laminae, said blocks being formed with cores conforming in configuration to said openings, said blocks being mounted in said guideway and connected to an endless chain, means for driving said chain, means for sequentially opening and closing said die blocks, means for applying heat and pressure to said die blocks when in closed position, and automatic means for freeing the bonded laminae from said cored blocks after they are opened.

7. A machine in accordance with claim 6 in which the means for freeing the bonded laminae from the cored die blocks comprises a movable plate mounted in each said die block between the face thereof and said laminae and means for moving said plate in a direction normal to the plane of said laminae.

8. A machine in accordance with claim 7 in which the means for moving said plate in a direction normal to the plane of said laminae comprises a pair of members movable in a direction normal to the plane of said laminae, the said members being positioned on opposite sides of said die blocks transverse to the direction of movement thereof, each of said members being formed with a slot into which the adjacent edge of said plate projects and is engaged as each die block passes opposite said members, motor means for moving said members in unison in opposite directions normal to the plane of said plate, switch means for automatically operating said motor in a gasket-freeing direction when a plate is engaged by said members, and switch means for automatically operating said motor to cause said members to move in the opposite direction, after freeing of the gasket and while the plate is engaged by said members.

References Cited

UNITED STATES PATENTS

| 1,944,277 | 1/1934  | Schoepfer    | 100—93  |
| 2,066,936 | 1/1937  | Jahraus      | 100—93  |
| 2,728,287 | 12/1955 | Tillinghast  | 100—3   |
| 2,995,482 | 8/1961  | Boyce et al. | 156—499 |

DOUGLAS J. DRUMMOND, *Primary Examiner.*

U.S. Cl. X.R.

100—93, 289